Sept. 27, 1960 T. E. BARANY 2,954,520
DIFFERENTIAL SPEED MEASUREMENT
Filed Oct. 24, 1957
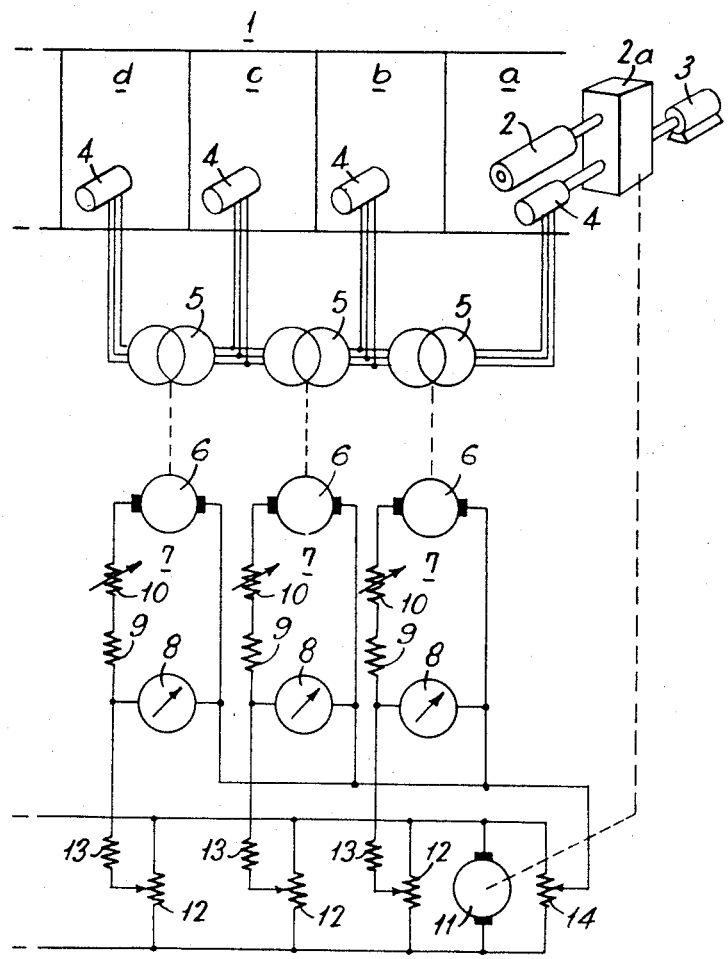
INVENTOR
THOMAS ERNEST BARANY
ATTORNEY

United States Patent Office 2,954,520
Patented Sept. 27, 1960

2,954,520

DIFFERENTIAL SPEED MEASUREMENT

Thomas Ernest Barany, Rugby, England, assignor to The British Thomson-Houston Company Limited, London, England, a British company Filed Oct. 24, 1957, Ser. No. 692,216

Claims priority, application Great Britain Oct. 25, 1956

3 Claims. (Cl. 324—69)

This invention relates to the measurement of the difference in peripheral speed of two rotating members, such as the rolls in respective sections of a paper machine.

On a paper machine it is important that, in order to avoid breaking the paper, the peripheral speeds of the rolls in the several sections, determined by the speeds of respective driving motors for the sections, should maintain a predetermined relationship with one another within very close limits. To achieve this it is usual to employ control apparatus which automatically controls the speeds of the various motors with respect to a common datum. In order to know the amount of draw to which the paper is being subjected, it is necessary to obtain some indication of any difference between the peripheral speeds of the rolls in successive sections. Moreover, it is obviously desirable that this measurement should be accurate at all mill speeds, the order of accuracy required being commonly one tenth of one percent.

Heretofore a commonly employed means of obtaining an indication of the difference in speed between rolls in any two sections has been to arrange for the motor of each such section to drive a tachometer generator (the drive to such generator being taken through any necessary gearing either from the motor shaft or from a roll shaft), and to measure the difference between the output voltages produced. It will be appreciated, however, that to obtain the required accuracy the measuring or indicating means, say a voltmeter, would have to be capable of detecting a very small difference between the tachometer generator voltages, whereas the voltages themselves would be comparatively high. Thus the nominal generated voltage might be, say 100 volts, in which case the voltmeter would have to be capable of indicating clearly a difference of 0.1 volt, and would thus require to be calibrated for say, 0–0.5 volt full scale deflection.

One advantage of such an arrangement is that a change of 0.1 volt in the voltage generated by one of the tachometer generators due, say, to some change in its characteristics, while being very small compared with the generated voltage, is of the same order as the quantity to be measured. To ensure that the desired accuracy is obtained, therefore, a more positive way of measuring the speed difference is required.

If the proportionality factors between the peripheral speeds of the several rolls and the corresponding inputs to the speed difference measuring equipment are not exactly the same, that is, if these inputs are not equal for the same peripheral speed of the different rolls, due for instance to departure of the diameter of a roll from a nominal value or to gearing ratios being not exactly the true theoretical value, errors proportional to running speed tend to be introduced and means are therefore required for introducing a correction for these errors into the measuring system. This can readily be done with tachometer generators used in the manner indicated, but the disadvantage of using the generators in that way is still present.

An object of the present invention is to provide an arrangement which can be used inter alia for more accurately indicating difference between the peripheral speeds of the rolls of a paper machine, which arrangement includes means by which a correction which automatically varies proportionally to the speed of the machine can be introduced. This correction can be arranged to compensate at all speeds within the normal range for divergence from nominal roll diameters and/or for discrepancies in gear ratios.

According to the invention, an arrangement for measuring difference of peripheral speed between two rotary members intended for rotation at peripheral speeds of approximately the same nominal value, employs a differential device, which may be mechanical or electrical, coupled to the rotary members to receive inputs proportional to their speeds and an output shaft the speed of which will be a measure of the difference in speed of the rotary members and will be zero when the speeds of said members are substantially the same, said output shaft of the differential device being arranged to drive a tachometer generator or the like the output of which, being then indicative of any difference in the speeds of the rotary members, is passed to a measuring circuit; together with means for introducing into the measuring circuit a compensating signal variable in accordance with said nominal value and selectively adjustable, for any particular nominal value, in accordance with the magnitude and sense of any compensation required at that particular value. It is contemplated that in carrying out the invention the differential device will comprise two selsyn transmitters having input shafts respectively rotatable with the rotary members, together with a differential selsyn electrically connected to the transmitters and having its output shaft mechanically coupled to the tachometer generator.

To effect the compensation required according to the invention, compensating current may be derived from a reference voltage of magnitude proportional to the nominal speed value referred to, which current is selectively adjustable in magnitude and sense for application to the measuring circuit to provide therein the measure of compensation required to overcome any errors in the output of the tachometer generator. Thus, the compensating current is combined with the output of the tachometer generator to produce in the measuring circuit, which may include any suitable form of indicating instrument, the required indication arising from any difference in peripheral speeds of the rotary members. The source of the reference voltage may conveniently be a further tachometer generator or the equivalent, which rotates at the nominal speed to which the peripheral speeds of the rotary members approximate.

In order that the invention may be more fully understood reference will now be made to the accompanying drawing the single figure of which illustrates in diagrammatic form, by way of example a particular embodiment of the invention as applied to a paper machine having a number of sections.

In the figure, full lines are used to represent electrical connections between components and dotted lines are used to represent mechanical couplings.

Referring to the figure there is indicated generally at 1 several roll sections $a, b, c, d$, of a paper machine, each comprising, as shown only for section $a$, at least one roll 2 driven by a motor 3. Gearing in a gear box $2a$ may be included between the motor 3 and roll 2. The motor 3 and the corresponding motors of the other sections are controlled (by known means not shown) normally to drive the rolls of the several sections at peripheral speeds approximating to a nominal value which will be referred to as the machine speed. It is assumed that the speed of motor 3 of section *a* can be taken as representing the machine speed.

For each of the sections *a, b, c, d*, a selsyn transmitter 4 is driven with the rolls such as 2 of that section via the gearing 2*a*. The transmitters 4 for each pair of adjacent sections are connected electrically to a differential selsyn 5 to which is mechanically coupled a tachometer generator 6. The outputs from the generators 6 of the several sections are fed to respective measuring circuits 7 each comprising an indicating instrument 8, such as a voltmeter which measures the output of the relevant generator 6, a fixed resistance 9 and an adjustable resistance 10.

The effective gear ratios between the roll 2 and the respective selsyn transmitters 4 are designed as near as possible so that when the rolls of all adjacent sections are of nominal diameter and are rotating at the same peripheral speed, the transmitters 4 are all rotating at the same speed and there is no rotation of the tachometer generators 6 by the differential selsyns 5. Under these conditions therefore, the generators 6 produce no output and the instruments 8 read zero. However, when there is a difference between the roll speeds of any two adjacent sections, the relevant tachometer generator 6 will be rotated in one direction or the other and the output therefrom will produce a reading on the corresponding instrument 8, the magnitude and direction of such reading being indicative of the speed difference and the sense of the difference respectively.

It is to be appreciated that in the embodiment described so far, any necessary correction for a difference in roll diameter from a nominal value could evidently be introduced for any particular machine speed by, for instance, suitably adjusting the zero setting of the relevant indicating instrument 8. Such adjustment, however, would then be applicable only at the particular machine speed for which it was made. Similarly, any adjustment made to compensate for difference between the theoretical and actual gear ratios would be applicable only at the particular machine speed at which it was made.

To enable a compensation to be introduced that is substantially correct at all machine speeds, a further tachometer generator 11 is provided which is mechanically coupled to the motor 3 of section *a* and is therefore rotated at a speed substantially proportional to the machine speed. Across the output of the tachometer generator 11 are connected potentiometers 12 having their respective adjustable arms connected through resistances 13 to one side of the indicating instruments 8, the other side of each of the latter being connected in common to a tapping on a resistance 14 also connected across the tachometer generator 11.

With this arrangement the tachometer generator 11 will produce a reference voltage proportional to the machine speed, from which voltage, a compensating current is derived.

The magnitude and sense of the compensating current passing through the instruments 8 can be adjusted independently of the outputs from the generator 6 by means of the respective potentiometers 12, and if the magnitude is adjusted to the required compensation value at any particular speed, it will then be automatically controlled to be correct at any other speed. Accordingly, when this compensating current combines in any of the instruments 8 with the output from the relevant tachometer generator 6, there is produced on the instrument 8 the required indication which is an accurate measurement of the difference in peripheral speeds of the rolls in the adjacent sections concerned.

What I claim is:

1. In an arrangement for measuring difference of peripheral speed between two rotary members intended for rotation at peripheral speeds approximating to a nominal value, employing a differential device coupled to the rotary members to receive inputs respectively proportional to their speeds and having an output shaft the speed of which will be a measure of the difference in speed of the rotary members and is zero when the speeds of said members are substantially the same, a tachometer generator arranged to be driven by the output shaft of the differential device, a measuring circuit including an indicating instrument connected to measure the output of said tachometer generator and thereby to indicate the speed difference between the rotary members, and means for introducing into the measuring circuit for measurement by said indicating instrument a compensating current varying in accordance with any variation of said nominal value and selectively and independently adjustable as regards any particular nominal value, in accordance with the magnitude and sense of any compensation required at that particular value for error introduced by differences in the proportionality factors between the peripheral speeds of the rotary members and the corresponding inputs to the differential device.

2. An arrangement as claimed in claim 1 wherein the differential device comprises two selsyn transmitters having input shafts respectively rotatable with the rotary members and a differential selsyn electrically connected to said transmitters and having an output shaft arranged to drive said tachometer generator or the like in accordance with any difference in the speeds of the transmitters.

3. An arrangement as claimed in claim 1 wherein the compensating means comprises a further tachometer generator arranged to be driven at a speed substantially proportional to said nominal value, together with means for applying a variable proportion of the output of this further tachometer generator to the measuring circuit as a compensating signal of appropriate magnitude and sense.

References Cited in the file of this patent

UNITED STATES PATENTS

| 2,149,847 | Kolin | Mar. 7, 1939 |
| 2,447,208 | Rendel | Aug. 17, 1948 |